United States Patent Office 3,535,194
Patented Oct. 20, 1970

3,535,194
SYNTHETIC LEATHER AND METHOD
OF MAKING SAME
Ernst Demme and Theodor Schachowskoy, Weinheim, Bergstrasse, Gerhard Koehnlein, Heidelberg, and Heinrich Thile, Kiel, Germany, assignors to Carl Freudenberg, Weinheim, Bergstrasse, Germany, a corporation of Germany
No Drawing. Continuation-in-part of abandoned application Ser. No. 526,066, Feb. 9, 1966. This application Apr. 18, 1969, Ser. No. 817,582
Claims priority, application Germany, Feb. 17, 1965,
F 45,269
Int. Cl. B32b 3/26, 5/16, 5/18
U.S. Cl. 161—92                                8 Claims

ABSTRACT OF THE DISCLOSURE

Process of producing a porous textile composite material including forming an ionotropic gel from an alginate, pectinate, or collagen, preferably an alginate, which ionotropic gel has transverse substantially cylindrical capillary channels therein; dipping this gel into a polyurethane precursor fluid, thereby coating the walls of said cylindrical capillary channels with polyurethane precursor, and polymerizing said polyurethane precursor on said channel walls, thereby reducing the internal cross-section of said channels; and adhering this gel with its reduced cross-section capillary channels to a fibrous textile substrate.

This application is a continuation-in-part of application Ser. No. 526,066, filed Feb. 9, 1966, now abandoned.

This invention relates to the manufacture of films. It more particularly refers to the production of film form material which is air and water vapor permeable. This invention also refers to the manufacture of articles comprising a substrate having a film form coating thereon which article is permeable to air and water vapor.

Attempts have been made to manufacture synthetic or artificial leather for many years. Polyvinyl chloride has been the material which has received the greatest emphasis and upon which the greatest amount of time and effort has been expended in seeking to develop a synthetic or artificial leather. Films formed of polyvinyl chloride, particularly plasticized polyvinyl chloride, can be made which have the feel and many of the properties of leather. Unfortunately, leather has one property which cannot be duplicated in polyvinyl chloride film, at least without further processing of the films as formed. That is, leather is permeable to air and to water vapor, while being relatively impervious to liquid water.

Attempts have been made to render polyvinyl chloride film pervious to water vapor and air, while retaining its imperviousness to liquid water. These attempts have been mechanical in nature in that the deficiencies of the film have been sought to be corrected by modifying the film after it has been formed. Such modifications have been attempted by perforating the film with relatively minute holes made either mechanically, e.g., by means of porcupine rolls or other similar devices, or by means of an electric spark. Unfortunately, physical perforations in polyvinylchloride film have a tendency to close up with time due to repeated action of relatively minor amounts of heat and pressure, such as would be built up with the flexing of the material, as would be the case where the material was used for shoe uppers and was subjected to flexure associated with walking.

Further, there is a limit to the number of perforations which can be made in any given area of film. Additionally, physically perforating polyvinyl chloride film weakens the film and may cause imperfections and damages which are sufficiently severe to cause rejection of the so-perforated film.

It has additionally been proposed to manufacture synthetic or artificial leather by coating suitable polymers onto textiles. Both woven and non-woven fabrics have been used to produce coated air and water vapor permeable sheet-shaped products. Such products have been produced by applying an inherently pervious coating as a solution to a preformed textile fabric and coagulating the pervious coating on and adhered to the fabric.

This latter approach to the problem of producing "breathable" leather-like materials has been successful. However, some diffiulty has been encountered in obtaining a completely uniformly porous product which has sufficiently good leather-like characteristics.

It is therefore an object of this invention to provide a uniformly porous leather-like material.

It is another object of this invention to produce a leather-like material which is inherently porous to water vapor and air.

It is a further object of this invention to provide a process for the production of pervious films according to this invention.

Other and additional objects of this invention will appear from a consideration of this entire specification including the claims appended hereto.

In accord with and fulfilling these objects, this invention comprises, in one of its aspects, a composite sheet form article comprising a textile substrate adhered to a microporous coating by means of an adhesive which is itself microporous and permeable with respect to air and water vapor. The porous coating comprises a gel of a polyelectrolyte having capillary passages therethrough, which passages are stabilized.

As an alternate to using a microporous adhesive between and joined to both the gel coating and to the textile substrate, it is practical, and in many cases preferred, to utilize an adhesive which is not water vapor and air permeable and to provide the adhesive as a discontinuous phase between the gel coating and the textile substrate. This may be accomplished suitably by applying the adhesive as multitudinous spots upon the textile substrate and/or the gel coating provided that these adhesive spots do not become joined by the pressure (preferably slight) used to adhere the coating to the substrate.

Adhesives useful in the practice of this invention are per se well known in the art and are exemplified by polyurethanes. It is practical to provide the adhesive on the mating surface of both the textile substrate and the gel coating, or upon either one of them. The adhesive may be applied in solution or suspension, as desired, as, for example, a solution in ethyl acetate.

According to this invention a composite structure comprising a porous textile substrate adhered to a coating which is an air and water vapor permeable polyelectrolyte ionotropic gel which gel has substantially cylindrical channels extending transversely therethrough, which channels have a coating of a polyurethane on the interior walls thereof. This composite article is produced by forming a sol of a suitable polyelectrolyte; causing the sol to gel while simultaneously forming cylindrical transverse capillary passages through the gel; coating the inside walls of the capillary passages with a polyurethane precursor; polymerizing the polyurethane precursor whereby stabilizing the capillary passages, adhering the gel to a textile substrate and reducing the cross-section of the capillary passages.

The polyelectrolyte gel coating useful in this invention is suitably prepared in the sol form and the sol gelled. Upon gellation, the water leaving the material leaves capillary channels in the gel. Generally speaking, these channels are substantially straight and substantially round in cross-section.

The polyelectrolyte used in the practice of this invention is suitably at least one selected from the group consisting of alginates, pectinates, and collagen. The polyelectrolyte concentration in the sol can be varied within wide limits without departing from the spirit and the scope of this invention, for example, from 0.5 to 3 percent by weight. Variations in the capillary size and in the number of capillaries can be accomplished by varying the concentration of the polyelectrolyte in the sol.

The capillary structures can be stabilized against permanently filling and against collapsing by the addition thereinto of diepoxides, aldehydes, isocyanato-terminated polyurethane prepolymers, polyvinyl chlorides, polymethacrylates, polyureas and resins of urea, melamine or phenol with formaldehyde. The stabilizer can be employed as a water, ketone or other solvent solution in concentrations of about 40 to 50 percent by weight. The number and size of the capillary passages in the gel is also to some exent determined by the particular stabilizer concentration and by the totol amount of stabilizer employed. It is practical to use about 40 to 50 percent by weight solutions of the stabilizer, 45 to 50 percent being preferred, and to provide stabilizer in a proportion of about 97 to 99.5 parts per part by weight of gel. The preferred stabilizer is an isocyanato-terminated polyurethane polymer. One gel is a copper alginate.

The following example is illustrative of the invention without in any way being limiting thereon.

EXAMPLE

The inner walls of a dish of a width of about 20 cm., a length of about 40 cm. and a height of about 5 cm. were lined with a thin alginate film which was dried at 100° C. Thereupon, alginate sol having a solids content of 1 percent was introduced up to a height of 1.5 cm. On the surface of this alginate sol, there was sprayed a 1 N $Cu(NO_3)_2$ solution after ½ hour, the dish was filled up to a height of 3 cm. with the same $Cu(NO_3)_2$ solution. At the end of 18 hours, the ionotropic gel was removed from the dish. The upper layer, which was too dense for the intended purpose of use, was first removed by means of a splitting machine with vibrating knife and thereupon the rest of the structure was cut with the same machine into discs of a thickness of 1 mm. The water of the gel structure was completely displaced from these discs with acetone. This process can be accelerated by a vibrator. Each of the split discs was treated with a solution of 145 g. of a polydiol (polydiol 200) and 220 g. hexamethylene diisocyanate in 600 g. acetone. The flat articles were then freed of acetone in a heating cabinet at 70° C. At the same time, the diisocyanate polydiol mixture reacted to form a polyurethane. Thereupon, the flat article was placed in water of 75° C., the excess diisocyanate reacted to form polyurea and carbondioxide.

The flat articles were dried and then sprayed on one side with a polyurethane adhesive (10 percent solution in ethyl acetate) and placed on a non-woven fiber web of superpolyamide fibers of a weight of 442 grams per square meter, which was bonded with butadiene-acrylonitrile copolymer and which also had been sprayed with the adhesive. The web and the gel were squeezed together with a slight pressure of 9.5 kg./cm.$^2$ at 30° C. In order to bind the adhesive, the structure was exposed for 15 minutes to a temperature of 100° C. After conditioning at 20° C. and 65 percent relative humidity, the structures had a water-vapor permeability of 5–6 mg./cm.$^2$/hr. (determined by the method of Mitton–IUP/15). The structures withstand 200,000 foldings in the Bally flexometer (IUP/20).

The textile substrate may be formed of woven, knit or non-woven fibers. These fibers may be of natural or synthetic origin and may be composed of cotton, polyamides, polyesters, polyacrylics, etc.

What is claimed is:

1. A synthetic leather composite structure comprising a porous textile substrate adhered to a thin preformed film comprising an air and water vapor permeable polyelectrolyte, ionotropic gel, having substantially cylindrical channels transversely therethrough, wherein said channels contain a polyurethane coating on the interior walls thereof.

2. The composite claimed in claim 1, wherein said substrate and coating are adhered by means of an adhesive applied as a discontinuous film.

3. The composite claimed in claim 1, wherein said substrate is a non-woven web of fibers which fibers are selected from the group consisting of polyamides, polyesters, cellulosics and polyacrylics.

4. A composite structure as claimed in claim 1, wherein said gel is a member selected from the group consisting of alginates, pectinates, and collagen.

5. The composite claimed in claim 2, wherein said adhesive is a polyurethane.

6. The process of producing the composite claimed in claim 1, which comprises forming a sol of a polyelectrolyte; causing said sol to gel thereby forming substantially cylindrical transverse capillary passages in said gel; coating the inside walls of said capillary passages with polyurethane precursor; polymerizing said polyurethane precursor; thereby stabilizing said capillary passages; longitudinally slicing said gel thereby to form a thin film thereof; placing adhesive on one side of said thin film; and adhering said thin film to a textile substrate through said adhesive.

7. The process claimed in claim 6, whereby said adhesive is applied to both said thin film and said textile substrate as a discontinuous film.

8. A composite structure as claimed in claim 1, wherein said ionotropic gel is copper alginate.

References Cited

UNITED STATES PATENTS

| 3,067,469 | 12/1962 | Yarrison | 156—498 XR |
| 3,190,766 | 6/1965 | Yuan | 117—140 R |
| 3,398,042 | 8/1968 | Odenthal et al. | 156—331 XR |

FOREIGN PATENTS 918,626  2/1963  Great Britain.

ROBERT F. BURNETT, Primary Examiner

R. H. CRISS, Assistant Examiner

U.S. Cl. X.R.

106—122; 117—62.2, 164; 156—77, 291; 161—148, 159, 170, 190; 252—316